United States Patent [19]
Krinner

[11] Patent Number: 6,092,328
[45] Date of Patent: Jul. 25, 2000

[54] DEVICE FOR LAYING FOIL-LIKE OR SHEET-LIKE TYPE MATERIAL, SPECIALLY STRIP-LIKE MATERIAL ON THE GROUND

[75] Inventor: Klaus Krinner, Blumenthal 19, 94342 Strasskirchen, Germany

[73] Assignee: Klaus Krinner, Strasskirchen, Germany

[21] Appl. No.: 09/117,055

[22] PCT Filed: Nov. 17, 1997

[86] PCT No.: PCT/DE97/02694

§ 371 Date: Dec. 21, 1998

§ 102(e) Date: Dec. 21, 1998

[87] PCT Pub. No.: WO98/21936

PCT Pub. Date: May 28, 1998

[51] Int. Cl.[7] .................................................... A01G 7/00
[52] U.S. Cl. ................................................... 47/1.01 R
[58] Field of Search ............................. 47/1.01 R, 9, 56; 111/199

[56] References Cited

U.S. PATENT DOCUMENTS

| 4,513,530 | 4/1985 | Nyboer . |
| 5,526,759 | 6/1996 | Cox ..................................... 111/199 X |

FOREIGN PATENT DOCUMENTS

| 0195760 | 9/1986 | European Pat. Off. . |
| 2086754 | 12/1971 | France . |
| 2427780 | 1/1980 | France . |
| 1504967 | 3/1978 | United Kingdom . |
| 2064284 | 6/1981 | United Kingdom . |

*Primary Examiner*—Robert P. Swiatek

[57] ABSTRACT

An apparatus for laying sheet material securely over a ground surface. The apparatus includes a first device configured to roll along the material. The first device creates a groove in the ground and simultaneously presses the material into the groove. A second device follows the first device and presses the ground together on opposite sides of the groove to secure the material into the groove.

13 Claims, 2 Drawing Sheets

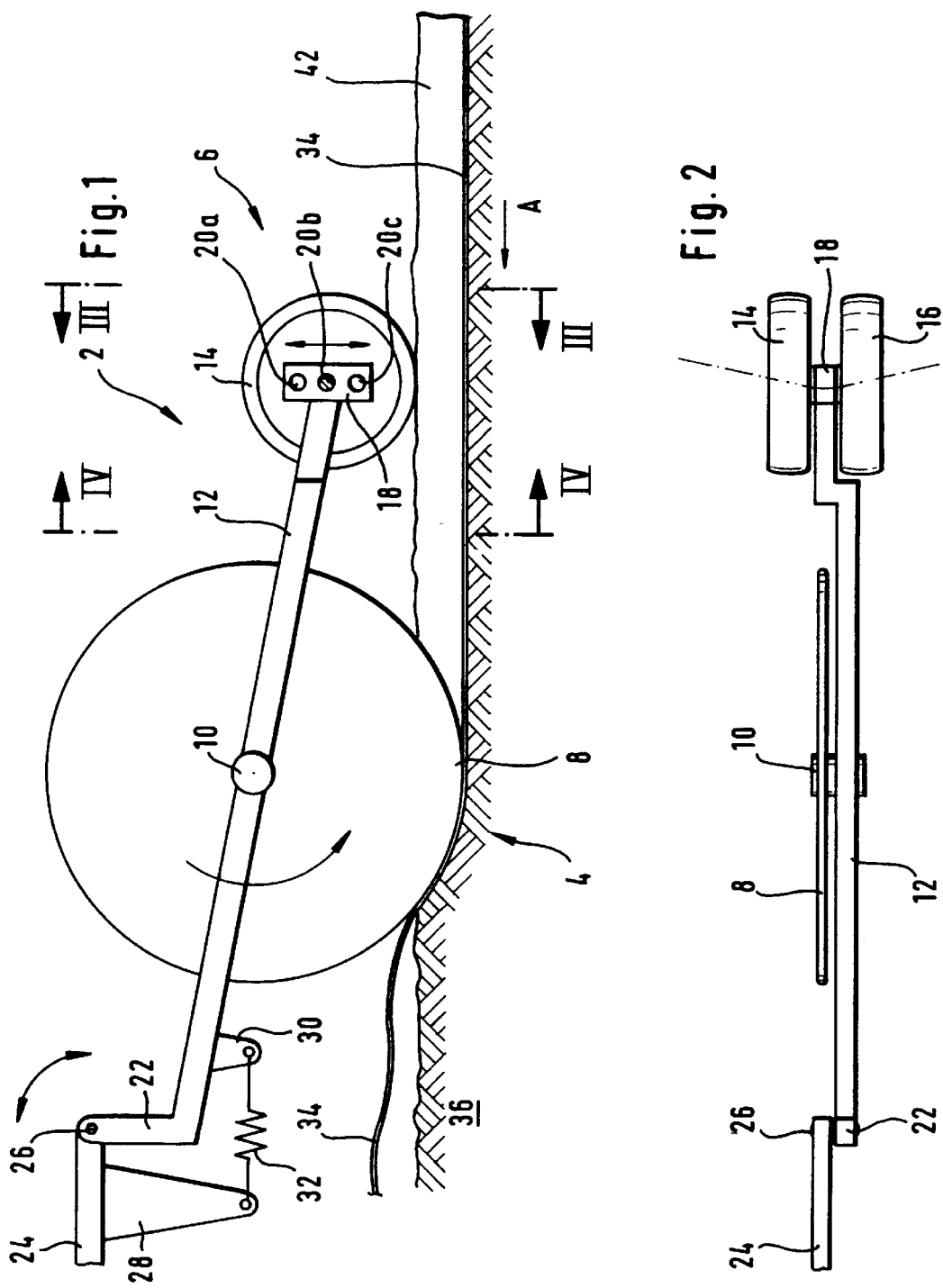

DEVICE FOR LAYING FOIL-LIKE OR SHEET-LIKE TYPE MATERIAL, SPECIALLY STRIP-LIKE MATERIAL ON THE GROUND

FIELD OF THE INVENTION

The invention relates to a device for fixing foil- or sheet-like material, especially strip-like material on the ground.

BACKGROUND OF THE INVENTION

In order to protect plants already grown or seeds coming up, for instance in the months of spring, it is known to cover the plants with foils or sheets. By means of this foil- or sheet-like material which mostly is strip-like, the plants or the seeds are protected from weather influences, in particular precipitation and cold.

If the plants in the field are in close vicinity in continuous rows, these rows being in parallel to each other at a certain distance, it is known to spread the strip-like material over the individual rows in the direction of their extension, and to fix them by means of weighing them down at both sides of the rows. This weighing down is effected either by stones, wooden bars or the like laid down on the edge of the material, or else the two lateral edges of the material extending in the longitudinal direction are covered with soil by means of digging or ploughing up.

This known procedure has established itself due to the lacking of other measures or devices despite the disadvantages entailed. The disadvantages in the case of these known measures of fixing or fastening foil- or sheet-like material on the ground are, among others, the following:

In the case of these known measures it is necessary to spread the material in advance at least over a predetermined length over the plants or the like to be protected in order to subsequently press down the lateral edges by means of objects laid thereupon or by drawing a soil furrow at both sides. In the case of windy weather, however, the material may be blown up and reversed time and again, before it is possible to fasten the edges.

Keeping down the edges by means of objects such as for instance wooden bars, stones or the like, is a complicated, longwinded and strenuous task. In the case of major plantations, for instance so-called strawberry fields or plantations, the total length of the individual planting rows may easily amount to several kilometers. The sheet- or foil covers then will be correspondingly long, and correspondingly many wooden bars, stones or the like will have to be available.

If the edges of the foil- or sheet-like material are pressed down by means of drawing a soil furrow, the complicated laying down of objects for the sake of weighing down the material and the subsequent removal of these objects in the course of taking off the covering is indeed not necessary, but the drawing of a soil furrow requires a certain amount of space. In the case of parallel planting rows, the space between the individual planting rows even has to be large enough to be able to draw two soil furrows in order to press down the two edges of the respective covers between the individual planting rows. This reduces the usable area under cultivation in a disadvantageous way.

Furthermore, the ploughing at both sides of the covers produces a more or less high earthwork which may, in the case of a water-impermeable cover of plastic foil, prevent rain or dew water from running down from the foil laterally. Thus, water puddles may form on the foil cover, which might press down and damage the plants thereunder.

SUMMARY OF THE INVENTION

As compared to this, it is the object of the present invention to provide a device as initially mentioned, by means of which a foil- or sheet-like material, especially a strip-like material, can be laid on the ground quickly and reliably without the disadvantages as described occurring.

For solving this object, the present invention suggests in accordance with claim 1 a device for fixing foil- or sheet-like material, especially strip-like material, on the ground, comprising a separating device which is movable along at least one side edge of the material and presses onto the material from the top, and simultaneously forms a substantially vertical cut in the ground, the material in the course of cutting being pressed into the cut that has been made, and a pressing device which follows the separating device and presses at least the cutting edges against the material located in the cut.

By means of the device according to the present invention, the fixing of foil- or sheet-like cover material can be simplified and streamlined quite considerably. It is sufficient to move the device along one side edge of the material and a cut is formed in the soil in one go, into which cut the edge of the material is pressed; subsequently, the soil is, by means of the following pressing device, compressed along the cutting edges in such a way that it adheres to the material located in the cut, so that the material is kept safely in the cut. The device can be moved along the individual side edges of the material either by hand or by making use of a slight traction engine in order to fix the side edges of the material.

The complicated, longwinding and strenous laying down of objects for the sake of weighing down the side edges of the strip-like material is no longer necessary.

Likewise, it is no longer necessary to provide so much space between the individual planting rows that two parallel soil furrows can be drawn so as to weigh down the material by means of soil.

The device according to the invention can be designed as a compact unit which is slight as compared to a plough, so that correspondingly slight traction engines are sufficient to move the device according to the invention along the side edges of the material. If necessary, traction engines can completely be renounced, and the device according to the invention can be moved by hand. In particular in the spring when the ground is strongly moistened and is heavy due to precipitations and melting processes, it is advantageous to be able to do without heavy traction engines to avoid the entailing compression of the ground.

Advantageous further developments of the invention constitute the subject matters of the subclaims.

Preferably, the separating device comprises a rotatable separating disc rolling on the surface of the material when making the cut and pressing the material into the cut forming underneath the material. Due to the rotatable separating disc the forming of the cut and the pressing of the material into the cut can be performed with little effort since the separating disc gradually presses itself into the ground to the depth desired in the course of the movement of the entire device along the side edge of the material. Due to the simultaneous rolling movement of the separating disc this pressing can be effected with little effort.

Preferably, the pressing device comprises at least one wheel following the separating device and pressing down and thus compressing the cutting edges. This constitutes a constructionally simple, but reliably operating embodiment of the pressing device. Furthermore, due to the development of the pressing device in the form of a wheel, the process of pressing is possible with little effort, too.

The running surface of the wheel of the pressing device preferably has a width exceeding the width of the cut so as to ensure reliable pressing of at least the cutting edges and thus reliable fixing of the material in the cut.

Furthermore, the wheel may, according to an embodiment, comprise a substantially V-shaped groove in the running surface thereof. Due to this, the pressing procedure of the two lateral edges of the cut still is further intensified in the direction of the material inbetween.

According to another embodiment, the pressing device may comprise two wheels running side by side and located at a distance from each other, which are arranged at both sides of the cut. Also by this means the two lateral cutting edges and, if applicable, the material of the ground located underneath the cutting edges are pressed towards each other and thus in the direction of the material inbetween.

The two wheels may be positioned in parallel and revolve about a common axle, or else the two wheels may be inclined towards each other and each revolve about an individual axle, both axles being inclined towards each other in rolling direction of the wheels in a substantially horizontal plane. In particular by the second possibility of arranging the two wheels a further intensified pressing of the cutting edges or cutting walls to the material inbetween is effected.

Preferably, the separating disc has a larger diameter as compared to the wheel or the wheels of the pressing device. The larger the diameter of the separating disc, the easier is the rolling movement, and the deeper the cut in the ground may be made.

In another preferred embodiment, the running surface of the separating disc is curved or rounded off. By this means, it can essentially be avoided that, in the course of the simultaneous cutting and pressing of the material into the cut, in particular in the case of soil that offers a certain resistance to cutting, the separating disc cuts the foil- or sheet-like material in two.

This may still be supported by the fact that the separating disc is force-driven in such a way that the circumferential speed thereof substantially corresponds to the speed of movement of the entire device. Due to this, no relative movement between the running surface or the circumference of the separating disc and the material thereunder is effected, which otherwise may result in the material being cut in two.

The separating device and the pressing device can be placed on the material with an adjustable pressure. By this measure, the kind of the material and the resistance thereof, respectively, and the kind and property of the ground can be taken into account.

Preferably, the separating device and the pressing device are accommodated in a common mounting rack which is mounted on a connecting rod and can be pivotally moved about a horizontal axle, wherein a spring is provided between the connecting rod and the mounting rack, which preloads the separating device and the pressing device in the direction of the material. Due to this, it first of all becomes possible to choose the degree of pressing due to the individual weight of the device and the strength of the spring, in order to achieve an adaptation to the resistance of the ground with respect to the forming of the cut. Due to the pivotal mounting of the mounting rack ,the possibility is moreover provided that the separating disc can, in the case of non-cuttable resistance in the ground, for instance major stones, roots or the like, perform an evasive movement to the top.

The individual weight of the device and the spring then again see to it that the separating disc again dives into the ground after travelling over the obstacle or resistance.

In another preferred embodiment, the wheel or the wheels of the pressing device is or are adjustable in height with respect to the mounting rack. Together with the spring between connecting rod and the mounting rack, the depth of penetration of the separating disc into the ground can be adjusted thereby.

The material to be laid preferably is dispensed continuously in the form of strips by a drum positioned in front of the separating device, and is guided under the separating device. If, in this case, the separating device is designed in such a way that it comprises two separating discs which are positioned side by side at a distance at which the width of the strip-like material is not exceeded, the strip-like material can be laid on the ground at both side edges in one go.

BRIEF DESCRIPTION OF THE DRAWINGS

Further details, aspects and advantages of the present invention result from the following description of one embodiment, making reference to the drawing as follows.

FIG. 1 a schematically simplified side view of the device according to the invention;

FIG. 2 a view from the top of the device of FIG. 1;

DESCRIPTION OF PREFERRED EMBODIMENTS

Figure 3:
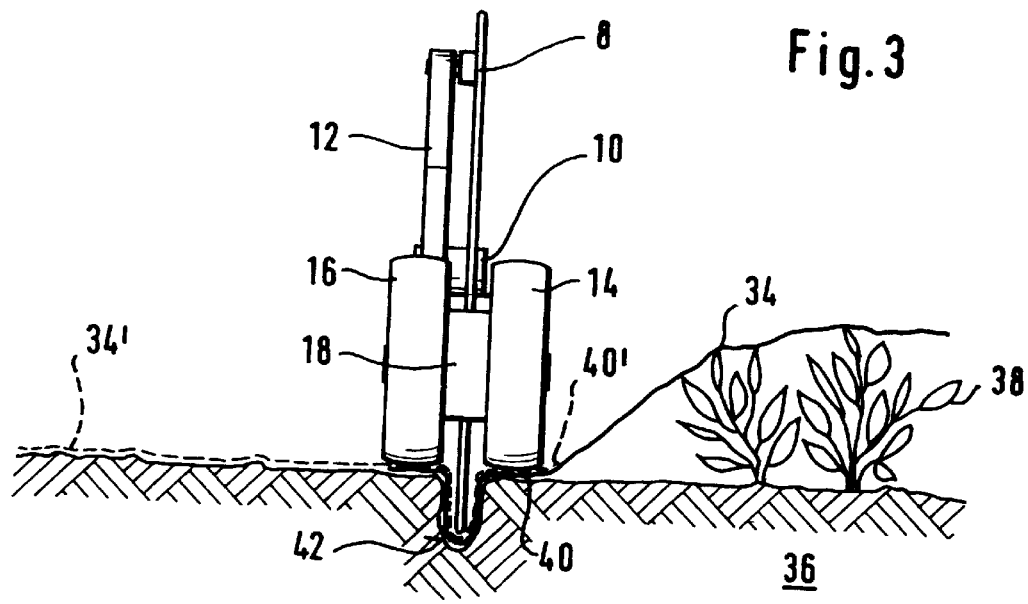
FIG. 3 a view from the rear of the device in a plane corresponding to the line III—III in FIG. 1.

A device according to the invention marked with 2 in the drawing substantially comprises, in accordance with FIG. 1, a separating device 4 and a pressing device 6. According to the drawing, the separating device 4 is designed in the form of a separating disc 8 which is mounted rotatably on a mounting rack 12 by means of a mounting 10. Likewise rotatably mounted on the mounting rack 12 is the pressing device 6 in the form of at least one, in the embodiment shown of two wheels 14 and 16. The mounting of the wheels 14 and 16 on the mounting rack 12 is effected by means of a mounting stand 18 fixed to the mounting rack 12, said mounting stand 18 offering a plurality of mounting possibilities for the rotating axle or the rotating axles of the wheels 14 and 16. In the embodiment shown in FIG. 1, the mounting stand comprises a total of three rotating mountings 20a to 20c.

At the end opposite to the pressing device 6, the mounting rack 12 is rotatably mounted on a connecting rod 24 via an angular projection 22. The connection between the angular projection 22 and the connecting rod 24 is effected by means of a rotating joint 26. According to FIG. 1, the connecting rod 24 comprises a flange 28 pointing to the bottom in the vicinity of the joint 26, and likewise does the mounting rack 12 comprise a flange 30 pointing to the bottom in the vicinity of the angular projection 22. A tension spring 32 is clamped between the two flanges 28 and 30. By means of the tension spring 32 the mounting rack 12 in FIG. 1 is preloaded rotating clockwise around the joint 26.

Via the connecting rod 24 the entire device 2 can be connected to a traction engine or the like. In FIG. 1, the direction of movement of the device 2 is in FIG. 1 in the direction of the arrow A from the right to the left.

In the following—still making reference to the drawing—the functioning and operation of the device 2 according to the invention is to be explained in more detail.

Figure 4:
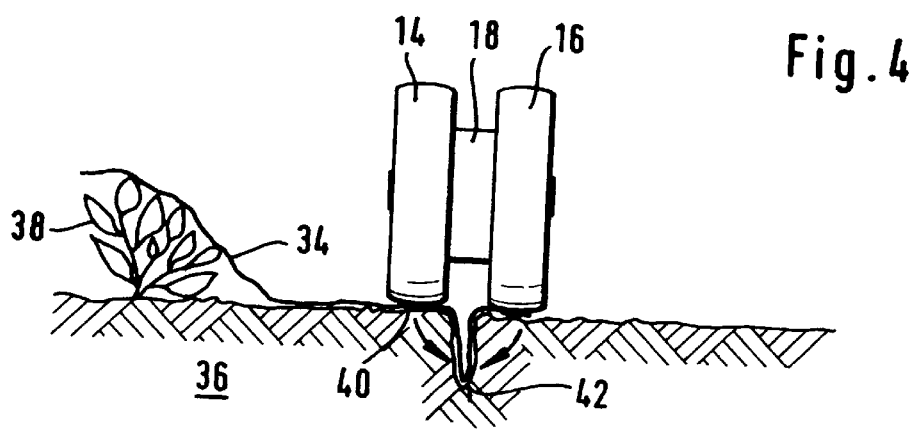
FIG. 4 a view corresponding to FIG. 3 along the line IV—IV in FIG. 1.

In order to fasten or fix a foil- or sheet-like, especially strip-like, material 34 (in the following referred to as "sheet") on the ground 36, the following method is employed:

The sheet 34 is laid on the ground 36 and covers, in accordance with FIGS. 3 and 4, a plant or herbaceous plant 38. If the plants 38 are planted continuously one after the other in a row, the strip-like sheet 34 also correspondingly covers the row of the plants 38 and lies with the two lateral edges thereof (edge 40 in FIGS. 3 and 4) on the ground 36 on both sides of the planting row. As soon as the sheet 34 has been laid over the planting row in such a way, the device 2 is moved along the edge 40 of the sheet 34 in the way to be gathered from FIG. 1. The separating disc 8 of the separating device 4 moving in the direction of movement of the device 2 rolls on the surface of the ground 36 or on the upper side of the sheet 34 covering the ground, respectively, and due to the individual weight of the device 2 and the tension of the tension spring 32 the separating disc 8 of the separating device 4 cuts a gap- or slit-shaped, substantially vertical cut 42 into the ground 36, wherein in the course of the forming of the cut 42 the material of the sheet 34 is pressed into this cut 42 by the running surface of the separating disc 8, as shown in FIG. 3.

The depth of penetration of the separating disc 8 into the ground 36 and thus the depth of the cut 42 depend on several factors. First of all, the mounting of the pressing device 6 or of the wheels 14 and 16, respectively, on the mounting stand 18 determines how far the separating disc 8 can penetrate the ground 36. If the mounting occurs in the mounting 20a, the depth of penetration of the separating disc 8 into the ground 36 is less deep than in the case of a mounting in the mounting 20b or 20c. Furthermore, the larger the diameter of the separating disc 8, the greater is the depth of penetration of the separating disc 8 with a predetermined position of the rotating mounting 10.

In order to ensure that the edge of the sheet 34 pressed into the cut 42 is safely kept in this cut 42, the pressing device 6 follows the separating disc 8 in the direction of travelling or movement. The wheel or the wheels 14 and 16 of the pressing device 6 travel, in accordance with FIG. 4, at both sides of the cut 42 and press at least the edges of the cut 42 that are close to the surface towards each other by means of compressing the ground (cf. the arrows on both sides of the cut 42 in FIG. 4), so that the sheet 34 or the edge strip thereof positioned in the cut 42, respectively, is laid in the cut 42 by the pressed ground.

This pressing or compressing function can, if applicable, be intensified by the fact that the two wheels 14 and 16 are, seen in the travelling direction of the device 2, slightly crossed or bent apart, i.e. that the wheels 14 and 16 each are running on their own axles which—as is illustrated in FIG. 2 by means of lines and dots)—are positioned in a substantially horizontal plane, but are, seen in forward travelling direction, inclined in a V-shaped manner towards each other.

Likewise, instead of the embodiment of the pressing device 6 with the two wheels 14 and 16 (as illustrated in the drawing), one single wheel may be used instead of these two wheels 14 and 16, which then has to be mounted on the mounting rack 12 in such a way that it gets to lie over the cut 42 produced by the separating disc 8. The width of this individual wheel in this case is such that the width of the cut 42 is exceeded to a sufficiently large extent at both sides in order to be able to compress the edges of the cut 42 towards each other. In this case, the running surface of the individual wheel may comprise a circumferential V-shaped groove in the pressing device 6. The deepest position of the V-shaped groove during the rolling movement of the individual wheel is about in the plane of the cut 42, so that the two flanks of the V-shaped groove can press the edges of the cut 42 towards each other, whereby the sheet 34 inbetween is also clamped.

The running surface of the separating disc 8 preferably is curved or semicircular in order to avoid that the separating disc 8 cuts the sheet 34 in two like a rolling knife in case the ground is particularly hard. The tendency of the separating disc 8 of cutting the sheet 34 in two may also be reduced or even eliminated by the fact that the separating disc 8 is force-driven in such a way that the circumferential speed thereof corresponds to the movement speed of the device 2, so that no relative movement or no slip occurs between the running surface of the separating disc 8 and the sheet 34.

The penetration of the separating disc 8 into the ground 36 is, on the one hand, effected by the individual weight of the entire device 2 and, on the other hand, by the influence of the tension spring 32 which preloads the mounting rack 12 in FIG. 1 clockwise and thus the separating disc 8 to the bottom until the wheels 14 and 16 touch on the surface of the ground 36 or of the sheet 34, respectively. If the separating disc 8 in the course of the forward movement of the device 2 meets an obstacle in the ground 36 which it cannot push aside, i.e. for instance a major stone, a root or the like, the pivotal mounting of the mounting rack 12 on the connecting rod 24 allows for an evasive movement of the separating disc 8 via the joint 26 counterclockwise to the top (cf. FIG. 1), so that it is ensured that the separating disc 8 does not cut the sheet 34 in two when the hard object in the ground is a resistance.

The fixing and fastening of the sheet 34 can, in accordance with another preferred embodiment of the invention, be performed continuously, i.e. the sheet 34 need not be laid over the planting rows in advance and subsequently be fixed with the device 2 at the edges of both sides. This procedure indeed is imaginable, but it is somewhat unfavourable in practice insofar as the likelihood always exists that the sheet 34 is lifted or reversed by the wind prior to the fixing thereof. For the continuous laying with subsequent fixing of the sheet 34, the sheet 34 is for instance mounted as a roll wound up in travelling direction of the device 2 in front of the separating device 4 e.g. at the rear of the traction engine. In the course of travelling, the sheet 34 is reeled off the roll and laid over the planting rows and subsequently, with two of the devices described above which are positioned at both sides at the longitudinal edges of the sheet 34, is pressed into the ground 36 simultaneously at the left and at the right of the planting row, and is fixed there.

Another embodiment of the present invention may include two separating discs. One separating disc would be in front of the sheet 34, and the second separating disc 8 would be behind the sheet 34. The front separating disc would form the cut 42 at least partially, but preferably, entirely. The separating disc 8 behind the sheet 34 would widen and/or deepen the cut 42 and would press the sheet 34 into the cut 42. pre-cutting the ground 36 in this manner would reduce the chance that the sheet 34 would tear in the area of the separating disc 8. This embodiment would mainly be used where the ground 36 is heavy or hard and/or with delicate foil or sheet material 34.

By means of the device 2 according to the invention, the sheet 34 thus can be fixed in the ground 36 quickly and reliably at both sides of the planting rows. No additional objects such as stones, wooden bars or the like are necessary to safely protect the sheet from winds. The fixing of the sheet is performed substantially along the entire longitudinal extension at both sides of the planting rows, so that winds will find no or only minor weak points. In the case of using a water-impermeable foil, the fixing achieved with the device 2 according to the invention allows for a largely unprevented running off of rain or melting water, so that the foil is not pressed onto the plants 38 by means of water puddles.

Edges or overlappings of two subsequent sheets or foils or of two adjacent sheets or foils, respectively, may also be performed in one go. Thus, for instance according to FIG. 3, the fixing of two parallel sheets 34 and 34' can be performed in one and the same cut 42, the sheets 34 and 34' being positioned one above the other or one next to the other, respectively, and being held by the ground 36 at both sides.

For removing the sheet or the foil it is sufficient to draw the sheet or the foil out of the cut 42. This may again be effected in such a way that a central accommodation means, for instance a driven winding drum, is positioned on a vehicle driving between the planting rows and continuously accommodating the sheet or the foil.

What is claimed is:

1. Apparatus for laying sheet material securely over a ground surface, said apparatus comprising:

a first device comprising a rotatable separating disc configured to roll along at least one side edge of said material, said first device being configured to create a vertical cut in the ground and to simultaneously press said material into said cut; and a second device configured to follow said first device and to press the ground on opposite sides of said cut together to secure said material into said cut;

said second device comprising two wheels traveling side by side at a distance from each other so as to be arranged at opposite sides of said cut.

2. Apparatus as defined in claim 1 wherein said two wheels are parallel to each other and rotate about a common axis.

3. Apparatus as defined in claim 1 wherein said two wheels are inclined toward each other and rotate about respective axes that are inclined toward each other in the forward rolling direction of said wheels in a substantially horizontal plane.

4. Apparatus as defined in claim 1 further comprising a pressure applying device operative to urge said separating disc forcefully against the ground.

5. Apparatus as defined in claim 4 wherein said pressure applying device includes a spring.

6. An apparatus for laying sheet material securely over a ground surface, said apparatus comprising:

a first device configured to roll along said material, said first device being configured to create a groove in the ground and to simultaneously press said material into said groove; and a second device configured to follow said first device and to press the ground together on opposite sides of said groove to secure said material into said groove.

7. Apparatus as defined in claim 6 wherein said second device comprises a first wheel on one side of said groove and a second wheel on an opposite side of said groove.

8. Apparatus as defined in claim 7 wherein said wheels are parallel and rotate about a common axis.

9. Apparatus as defined in claim 7 wherein said wheels are skewed relative to each other.

10. Apparatus as defined in claim 6 wherein said second device comprises one wheel with a width exceeding the width of said groove so as to span said groove and contact the ground on opposite sides of said groove.

11. Apparatus as defined in claim 10 wherein said wheel has a groove in its rolling surface.

12. Apparatus as defined in claim 6 further comprising a pressure applying device operative to urge said first device forcefully against the ground.

13. Apparatus as defined in claim 12 wherein said pressure applying device includes a spring.

* * * * *